(12) United States Patent
Liu et al.

(10) Patent No.: US 12,366,780 B2
(45) Date of Patent: Jul. 22, 2025

(54) PIXEL STRUCTURE AND DISPLAY PANEL

(71) Applicant: SUZHOU CHINA STAR OPTOELECTRONICS TECHNOLOGY CO., LTD., Suzhou (CN)

(72) Inventors: Yingying Liu, Suzhou (CN); Jianjian Ying, Suzhou (CN); Peng Du, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 17/769,776

(22) PCT Filed: Apr. 14, 2022

(86) PCT No.: PCT/CN2022/086810
§ 371 (c)(1),
(2) Date: Apr. 18, 2022

(87) PCT Pub. No.: WO2023/178757
PCT Pub. Date: Sep. 28, 2023

(65) Prior Publication Data
US 2025/0004335 A1   Jan. 2, 2025

(30) Foreign Application Priority Data
Mar. 23, 2022  (CN) .................. 202210290927.8

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC ...................................... G02F 1/1362
See application file for complete search history.

(56) References Cited

U.S. PATENT DOCUMENTS

| 2007/0018930 A1* | 1/2007 | Do ................. G09G 3/3648 345/96 |
| 2008/0079678 A1* | 4/2008 | Cho ................ G09G 3/3648 345/88 |

(Continued)

FOREIGN PATENT DOCUMENTS

| CN | 101154361 A | 4/2008 |
| CN | 103149759 A | 6/2013 |

(Continued)

*Primary Examiner* — Ryan Crockett
(74) *Attorney, Agent, or Firm* — Dickinson Wright PLLC

(57) ABSTRACT

A pixel structure and a display panel are disclosed. The pixel structure includes a plurality of data lines, a plurality of scan lines, and a plurality of pixel rows. The scan line of a next stage of the pixel row where a first pixel unit is located is connected to the sub-pixel with the highest brightness under the same gray scale in the same first pixel unit. This can reduce a coupling capacitance received by the sub-pixel with the highest brightness in the same gray level, and further reduce a feeder voltage received by the sub-pixel with the highest brightness in the same gray level.

16 Claims, 3 Drawing Sheets

(56) References Cited

U.S. PATENT DOCUMENTS

| | | | | |
|---|---|---|---|---|
| 2011/0109863 | A1* | 5/2011 | Liu | G02F 1/136259 |
| | | | | 445/2 |
| 2012/0274870 | A1* | 11/2012 | Liu | G02F 1/136259 |
| | | | | 349/55 |
| 2014/0132651 | A1* | 5/2014 | Hung | G09G 3/3648 |
| | | | | 345/694 |
| 2015/0379947 | A1* | 12/2015 | Sang | G02F 1/1368 |
| | | | | 349/37 |
| 2016/0131954 | A1* | 5/2016 | Li | H10D 86/60 |
| | | | | 349/33 |
| 2018/0033383 | A1 | 2/2018 | Kim et al. | |
| 2024/0038191 | A1* | 2/2024 | Kim | G09G 3/3614 |

FOREIGN PATENT DOCUMENTS

| | | | | |
|---|---|---|---|---|
| CN | 208156380 U | 11/2018 | | |
| CN | 112540486 A | 3/2021 | | |
| CN | 112540487 * | 3/2021 | ........... | G02F 1/1362 |
| CN | 112540487 A | 3/2021 | | |
| CN | 113741107 A | 12/2021 | | |
| CN | 114170986 A | 3/2022 | | |

* cited by examiner

PIXEL STRUCTURE AND DISPLAY PANEL

CROSS-REFERENCE TO RELATED APPLICATIONS

This application is a U.S. National Stage of International Application No. PCT/CN2022/086810, filed on Apr. 14, 2022, which claims the benefit and priority of Chinese Patent Application No. 202210290927.8, filed on Mar. 23, 2022, the entire contents of which are incorporated herein by reference.

FIELD OF INVENTION

The present application relates to the field of display technologies, and more particularly to a pixel structure and a display panel.

BACKGROUND OF INVENTION

A data line sharing (DLS) pixel architecture is a pixel architecture commonly used in pixel structures that saves a chip on film (COF) and reduces costs. As shown in FIG. 1, this pixel architecture means that two adjacent sub-pixels in the same row are powered by the same data line. For example, a data line DL1 simultaneously charges adjacent sub-pixels R11 and G12 in the same row, a data line DL2 charges sub-pixels B13 and R14 that are in the same row and adjacent to each other, and a data line DL3 charges adjacent sub-pixels G15 and B16 in the same row. Two gate lines turn on corresponding sub-pixels in the same row successively. For example, a gate line GL1 may be used to turn on the sub-pixel R11, the sub-pixel B13, and the sub-pixel G15, and a gate line GL2 may be used to turn on the sub-pixel G12, the sub-pixel R14, and the sub-pixel B16.

It is also because of the above-mentioned situation that the sub-pixels in the same row are turned on successively, resulting in a time difference between two adjacent pixels in the same row being turned on before and after. In the case of a still picture, this time difference is superimposed on a brightness of the human eye, and the human eye cannot distinguish this brightness difference. However, when a dynamic picture is played or a person is shaking his head while watching, bright and bright or dark and dark pixels are superimposed, and the human eye will capture the streak or grid-like phenomenon, that is, shaking stripes, which will give people a bad visual perception. This streak or grid-like phenomenon becomes more pronounced when different pixels have differences in brightness.

Technical Problem

The present application provides a pixel structure and a display panel to alleviate the technical problem that stripes or grid-like phenomena are easily observed under dynamic conditions.

SUMMARY OF INVENTION

In a first aspect, the present application provides a pixel structure comprising a plurality of data lines arranged in sequence along a first direction; a plurality of scan lines arranged in sequence along a second direction, wherein the first direction and the second direction are perpendicular to each other; and a plurality of pixel rows arranged in sequence along the second direction, wherein one of the pixel rows is located between two adjacent ones of the scan lines, and there are two of the pixel rows between two adjacent ones of the pixel rows; wherein the one of the pixel rows comprises a plurality of first pixel units arranged in sequence along the first direction, one of the first pixel units comprises six sub-pixels located in a same row and arranged in sequence along the first direction, there are two of the sub-pixels of the one of the first pixel units between two adjacent ones of the data lines, and the two of the sub-pixels of the one of the first pixel units located between the two adjacent ones of the data lines are connected to a same one of the data lines; in a same one of the first pixel units, the sub-pixels with a highest brightness under a same gray scale are all connected to the scan lines at a next stage of the pixel rows where the same one of the first pixel units is located.

In some embodiments, one of the first pixel units comprises a first sub-pixel, a second sub-pixel, a third sub-pixel, a fourth sub-pixel, a fifth sub-pixel, and a sixth sub-pixel located in a same row and arranged in sequence along the first direction, the second sub-pixel and the fifth sub-pixel are the sub-pixels with the highest brightness under the same gray scale; the scan lines comprise a first scan line, a second scan line, and a third scan line arranged in sequence along the second direction, the first scan line, the first pixel unit, the second scan line, the first scan line, the one of the first pixel units, the second scan line, and the third scan line are sequentially arranged along the second direction, the first scan line is connected to the first sub-pixel, the third sub-pixel, and the sixth sub-pixel, and the second scan line is connected to the second sub-pixel and the fifth sub-pixel.

In some embodiments, the second scan line is further connected with the fourth sub-pixel.

In some embodiments, the first sub-pixel and the fourth sub-pixel are sub-pixels of a same color, the second sub-pixel and the fifth sub-pixel are sub-pixels of a same color, and the third sub-pixel and the sixth sub-pixel are sub-pixels of a same color.

In some embodiments, the second sub-pixel and the fifth sub-pixel are both green sub-pixels.

In some embodiments, another pixel row adjacent to the one of the pixel rows in the second direction further comprises a plurality of second pixel units, one of the second pixel units comprises six sub-pixels located in a same row and arranged in sequence along the first direction, there are two of the sub-pixels of the one of the second pixel units between two adjacent ones of the data lines, and the two of the sub-pixels of the one of the second pixel units located between the two adjacent ones of the data lines are connected to a same data line, in a same one of the second pixel units, the sub-pixels with a highest brightness under a same gray scale are all connected to the scan lines at a next stage of the pixel rows where the same one of the second pixel units is located.

In some embodiments, one of the second pixel units comprises a seventh sub-pixel, an eighth sub-pixel, a ninth sub-pixel, a tenth sub-pixel, an eleventh sub-pixel, and a twelfth sub-pixel located in a same row and arranged in sequence along the first direction, the eighth sub-pixel and the eleventh sub-pixel are the sub-pixels with the highest brightness under the same gray scale; the scan lines comprise a fourth scan line arranged along the second direction, the third scan line, the one of the second pixel unit, and the fourth scan line are sequentially arranged along the second direction, the third scan line is connected to the seventh sub-pixel, the ninth sub-pixel, and the twelfth sub-pixel, and the fourth scan line is connected to the eighth sub-pixel and the eleventh sub-pixel.

In some embodiments, the fourth scan line is further connected to the tenth sub-pixel.

In some embodiments, the first sub-pixel and the seventh sub-pixel are located in a same column and are both red sub-pixels, polarities of the first sub-pixel and the seventh sub-pixel in a same frame are opposite, the second sub-pixel and the eighth sub-pixel are located in a same column and are both green sub-pixels, and polarities of the second sub-pixel and the eighth sub-pixel in a same frame are opposite; the third sub-pixel and the ninth sub-pixel are located in a same column and are both blue sub-pixels, polarities of the third sub-pixel and the ninth sub-pixel in a same frame are opposite, the fourth sub-pixel and the tenth sub-pixel are located in a same column and are both red sub-pixels, and polarities of the fourth sub-pixel and the tenth sub-pixel in a same frame are opposite; the fifth sub-pixel and the eleventh sub-pixel are located in a same column and are both green sub-pixels, polarities of the fifth sub-pixel and the eleventh sub-pixel in a same frame are opposite, the sixth sub-pixel and the twelfth sub-pixel are located in a same column and are both blue sub-pixels, and polarities of the sixth sub-pixel and the twelfth sub-pixel in a same frame are opposite.

In some embodiments, the first pixel units and the second pixel units are arranged alternately in sequence in the second direction.

In a second aspect, the present application provides a display panel. The display panel includes an array substrate, a color filter substrate disposed opposite to the array substrate, and a liquid crystal layer encapsulated between the array substrate and the color filter substrate. The array substrate includes the pixel structure in at least one of the above embodiments.

Beneficial Effect:

In the pixel structure and the display panel provided by the present application, the scan line at the next stage of the pixel row where the first pixel unit is located is connected to the sub-pixel with the highest brightness under the same gray scale in the same first pixel unit. This can reduce a coupling capacitance suffered by the sub-pixel with the highest brightness under the same gray scale. Further, a feeder (feed-through) voltage received by the sub-pixel with the highest brightness under the same gray scale is reduced, thereby reducing a visual phenomenon of shaking stripes.

DETAILED DESCRIPTION OF PREFERRED EMBODIMENTS

Figure 1:
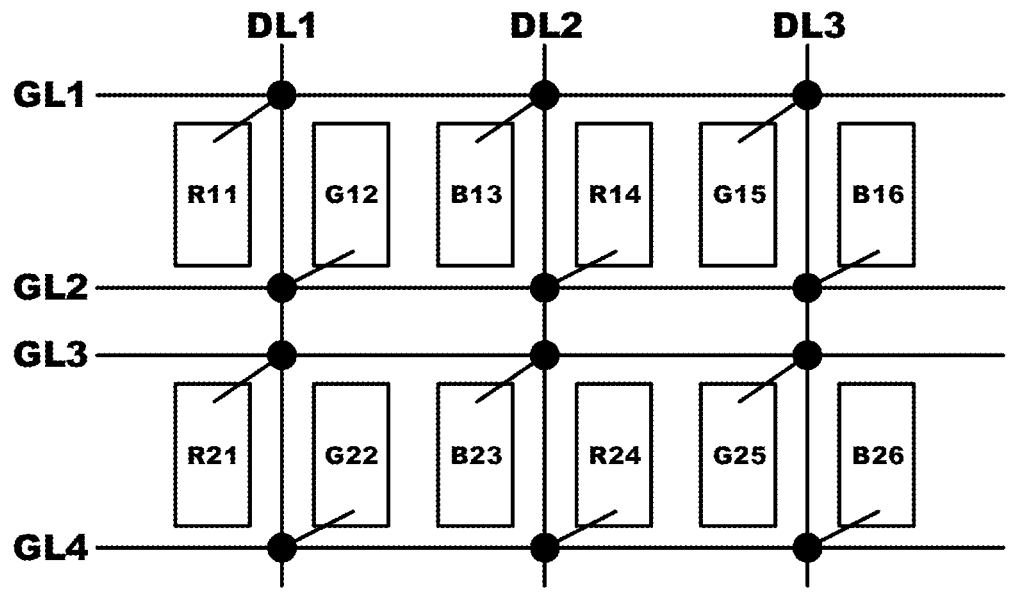
FIG. 1 is a schematic diagram of a first structure of a pixel structure in a related technical solution.

In order to make the objectives, technical solutions and effects of the present application clearer, the present application will be further described in detail below with reference to the accompanying drawings and examples. It should be understood that the specific embodiments described herein are only used to explain the present application, but not to limit the present application.

In the description of the present disclosure, it should be understood that the orientations or positional relationships indicated by terms "center", "longitudinal", "lateral", "length", "width", "thickness", "top", "bottom", "front", "back", "left", "right", "vertical", "horizontal", "top", "bottom", "inside", "outside", "clockwise", "counterclockwise", etc. are all based on the orientations or positional relationships shown in the accompanying drawings. This is only for simplifying the description of the present disclosure, rather than indicating or implying that the device or component referred to must have a particular orientation, be constructed and operate in a particular orientation, and thus should not be construed as a limitation of the disclosure. In addition, the terms "first" and "second" are only used for descriptive purposes, and should not be construed as indicating or implying relative importance or implying the number of indicated technical features. Thus, features defined as "first", "second" may expressly or implicitly include one or more of said features. In the description of the present disclosure, "plurality" means two or more, unless expressly and specifically defined otherwise.

In the description of the present disclosure, it should be noted that the terms "installed", "connected" and "linked" should be construed in abroad sense unless otherwise expressly specified and limited. For example, it may be a fixed connection, a detachable connection, or an integral connection. It can be a mechanical connection or an electrical connection or can communicate with each other. It can be directly connected or indirectly connected through an intermediary. It can be a connection within two components or an interaction relationship between two components. For those of ordinary skill in the art, the specific meanings of the above terms in the present disclosure can be understood according to specific situations.

In the present disclosure, unless otherwise expressly specified and limited, a first feature "on" or "under" a second feature may include the first feature and the second feature in direct contact, or may include the first feature and the second feature are not in direct contact but through a third feature outside of them. Also, the first feature being "above", "over", and "above" the second feature includes the first feature being directly above and obliquely above the second feature, or simply means that the first feature is at a higher level than the second feature. The first feature is "below", "under" and "underneath" the second feature includes the first feature is directly and diagonally below the second feature, or simply means that the level of the first feature is less than that of the second feature.

Figure 2:
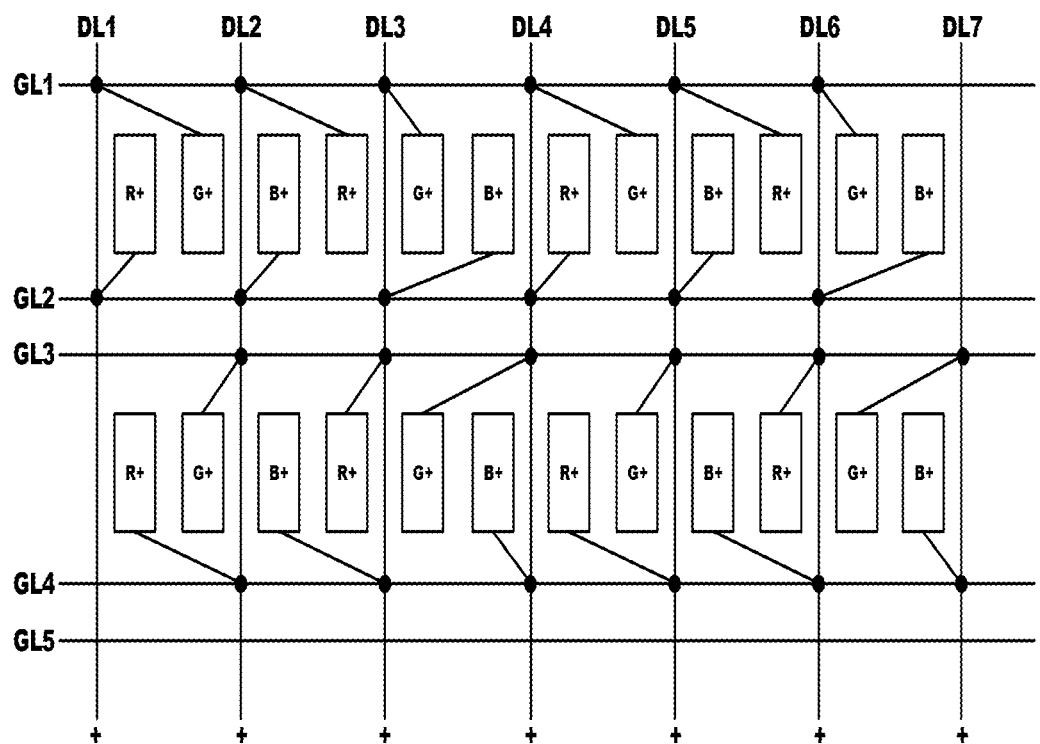
FIG. 2 is a schematic diagram of a second structure of a pixel structure in a related technical solution.

A DLS pixel architecture shown in FIG. 2 includes a first row of sub-pixels and a second row of sub-pixels. In the first row of sub-pixels, the first sub-pixels from left to right are connected to a data line DL1 through a bottom connection. The second sub-pixels from left to right are connected to the data line DL1 through a top connection. The third sub-pixels from left to right are connected to the data line DL2 through a bottom connection. The fourth sub-pixels from left to right are connected to the data line DL2 through a top connection. The fifth sub-pixels from left to right are connected to the data line DL3 through a top connection. The sixth sub-pixels from left to right are connected to the data line DL3 through a bottom connection. The seventh sub-pixel, the eighth sub-pixel, the ninth sub-pixel, the tenth sub-pixel, the eleventh sub-pixel, and the twelfth sub-pixel from left to right respectively repeat the connection manner of the first sub-pixel to the sixth sub-pixel. A scan line GL1 may be connected to the first sub-pixel, the third sub-pixel, the fifth sub-pixel, the seventh sub-pixel, etc. in the first row of sub-pixels. The scan line GL2 may be connected to the second sub-pixel, the fourth sub-pixel, the sixth sub-pixel, the eighth sub-pixel, etc. in the first row of sub-pixels. A scan signal in the scan line GL1 can control the corresponding sub-pixel to charge first, and then a scan signal in the scan line GL2 controls the corresponding sub-pixel to charge. Alternatively, the charging sequence of the two can be reversed.

In the second row of sub-pixels, the first sub-pixels from left to right are connected to the data line DL2 through a bottom connection. The second sub-pixels from left to right are connected to the data line DL2 through a top connection. The third sub-pixels from left to right are connected to the data line DL3 through a bottom connection. The fourth sub-pixels from left to right are connected to the data line DL3 through a top connection. The fifth sub-pixels from left to right are connected to the data line DL4 through a top connection. The sixth sub-pixels from left to right are connected to the data line DL4 through a bottom connection. The seventh sub-pixel, the eighth sub-pixel, the ninth sub-pixel, the tenth sub-pixel, the eleventh sub-pixel, and the twelfth sub-pixel from left to right respectively repeat the connection manner of the first sub-pixel to the sixth sub-pixel. The scan line GL3 may be connected to the first sub-pixel, the third sub-pixel, the fifth sub-pixel, the seventh sub-pixel, etc. in the second row of sub-pixels. The scan line GL4 may be connected to the second sub-pixel, the fourth sub-pixel, the sixth sub-pixel, the eighth sub-pixel, etc. in the first row of sub-pixels. A scan signal in the scan line GL3 can control the corresponding sub-pixel to charge first, and then a scan signal in the scan line GL4 controls the corresponding sub-pixel to charge. Alternatively, the charging sequence of the two can be reversed.

The second sub-pixel and the fifth sub-pixel in the first row of sub-pixels and the second sub-pixel and the fifth sub-pixel in the second row of sub-pixels are all connected to the corresponding data lines through a top connection. In addition, coupling capacitances received by different sub-pixels are different, resulting in that the coupling capacitances received by sub-pixels similar to the second sub-pixel and the fifth sub-pixel are relatively large. The higher the feeder voltage is, the more serious the shaking stripes are.

Figure 3:
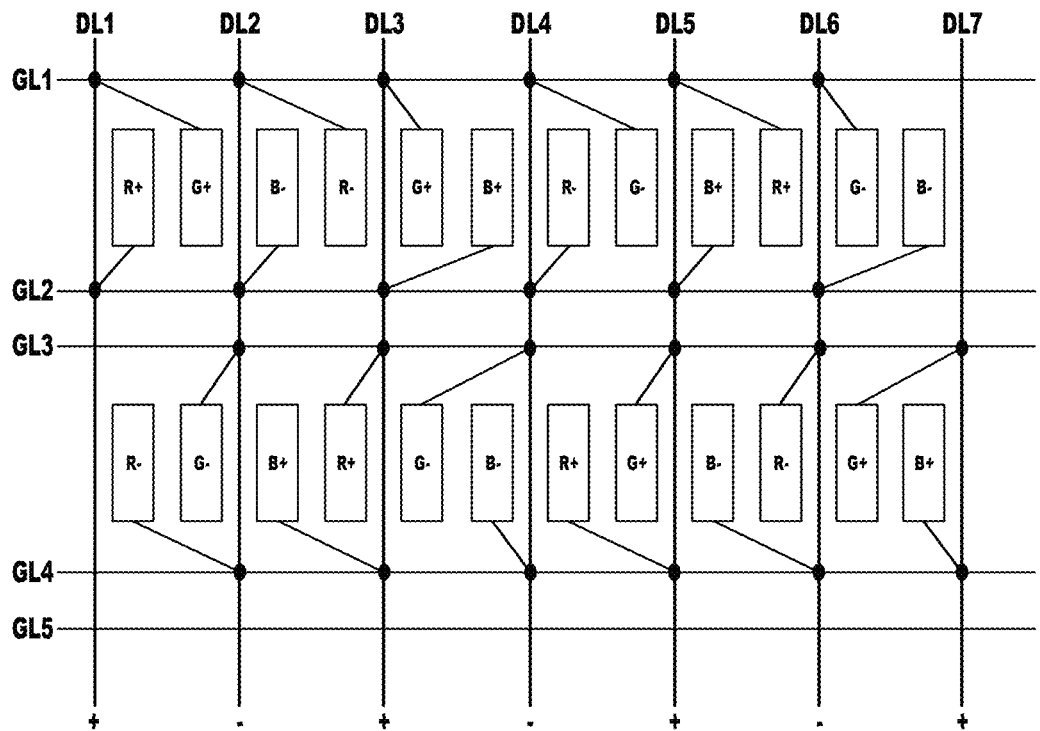
FIG. 3 is a schematic diagram of a third structure of a pixel structure in a related technical solution.

The structure of the DLS pixel shown in FIG. 3 is similar to the structure of the DLS pixel shown in FIG. 2, and the connection method of each sub-pixel to the corresponding data line is also the same, and the difference is the polarity inversion method of the two.

R can be used to characterize the red sub-pixel, G can be used to characterize the green sub-pixel, and B can be used to characterize the blue sub-pixel.

It should be noted that after long-term research, it was found that the pure color images of the two models in FIG. 2 and FIG. 3 were compared through experiments. The shaking stripes are the most obvious when the pure green images of the two models are observed. The blue screen of the model shown in FIG. 3 shows the slightest shaking stripes. When the red screen of the model shown in FIG. 2 is on the red screen, the shaking stripes are the least. As shown in FIG. 3, under the L127 gray scale, a luminance ratio of green sub-pixels, red sub-pixels, and blue sub-pixels is 14:4:1. By analyzing the equivalent circuit in FIG. 5, it can be known that the scan line GL2 has a relatively large coupling capacitance Cpg1 to the pixel electrode 11 of the sub-pixel connected to the scan line GL1. The pixel electrode 12 of the sub-pixel connected to the scan line GL3 and the scan line GL2 has a relatively small coupling capacitance Cpg2 due to the long distance. In the pixel structure shown in FIG. 3, four pixels in one cycle are the first sub-pixel to the twelfth sub-pixel from left to right in the first row of sub-pixels, the green sub-pixels just all suffer from the larger coupling capacitance Cpg1, and the blue sub-pixels all suffer from the smaller coupling capacitance Cpg2. According to the feeder voltage $Vft=(Cgs+Cpg)/Ctotal$ caused by the closing of the scan line, the green sub-pixel is subjected to the largest feeder voltage, and the feeder voltage experienced by the blue sub-pixel is the smallest. Ctotal is the sum of capacitances associated with all sub-pixels. For example, Ctotal may be the sum of the liquid crystal capacitance Clc, the gate-source capacitance Cgs, and the storage capacitance Cst. Similarly, in the model shown in FIG. 2, the green sub-pixel also experiences the largest feeder voltage, and the red sub-pixel experiences the smallest feeder voltage.

Figure 4:
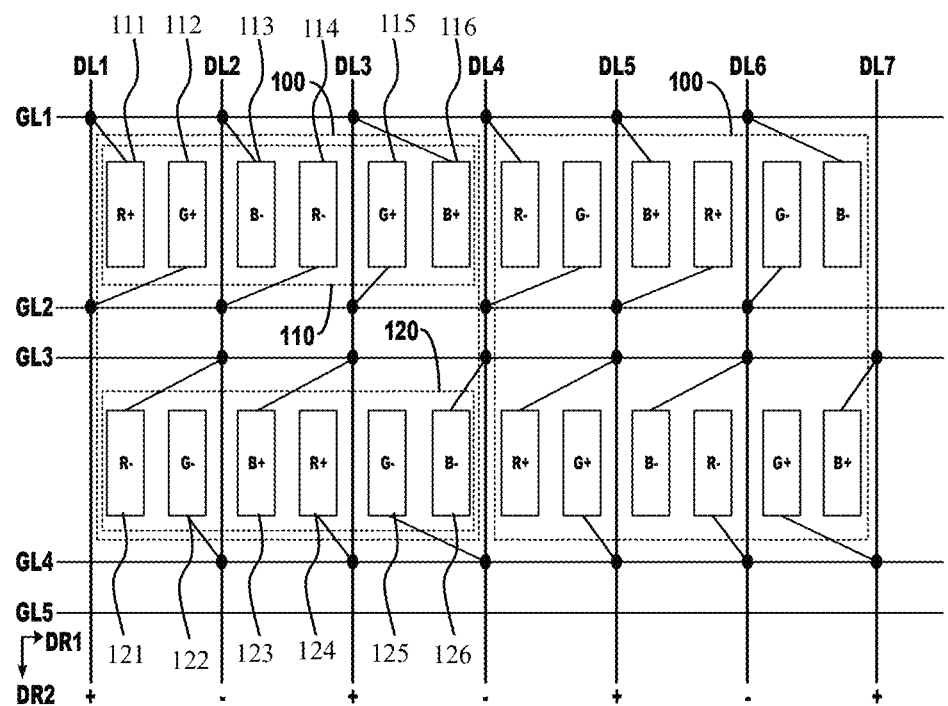
FIG. 4 is a schematic structural diagram of a pixel structure provided by an embodiment of the present application.

In view of this, this embodiment provides a pixel structure. As shown in FIG. 4, the pixel structure includes multiple data lines sequentially arranged along a first direction DR1, multiple scan lines sequentially arranged along a second direction DR2, and multiple pixel rows sequentially arranged along the second direction DR2. The first direction DR1 and the second direction DR2 are perpendicular to each other. Each pixel row is located between two adjacent scan lines. There are two scan lines between two adjacent pixel rows. The pixel row includes a plurality of first pixel units 110 arranged in sequence along the first direction DR1. The first pixel unit 110 includes six sub-pixels located in the same row and sequentially arranged along the first direction DR1. There are two sub-pixels between two adjacent data lines. Two sub-pixels located between two adjacent data lines are connected to the same data line. In the same first pixel unit 110, the sub-pixels with the highest brightness under the same gray scale are all connected to the scan lines of the next stage of the pixel row where the first pixel unit 110 is located.

It can be understood that, the display panel provided in this embodiment, the scan line GL2 at the next stage of the pixel row where the first pixel unit 110 is located is connected to the sub-pixel with the highest brightness under the same gray scale in the same first pixel unit 110. This can reduce a coupling capacitance suffered by the sub-pixel (e.g., the second sub-pixel 112 or the fifth sub-pixel 115) with the highest brightness under the same gray scale. Further, a feeder (feed-through) voltage received by the sub-pixel with the highest brightness under the same gray scale is reduced, thereby reducing a visual phenomenon of shaking stripes.

It should be noted that the solid origins in FIG. 1 to FIG. 4 only represent that the sub-pixels are connected to the corresponding data lines and scan lines respectively, and do not indicate that the corresponding data lines and scan lines are directly connected.

This embodiment provides a pixel structure. As shown in FIG. 4, the pixel structure includes at least one pixel unit 100, a first scan line GL1, a second scan line GL2, and a third scan line GL3 arranged in sequence along the second direction DR2, a first data line, a second data line, and a third data line arranged in sequence along the first direction DR1.

The pixel unit 100 includes a first pixel unit 110. The first pixel unit 110 includes first pixels and second pixels which are located in the same row and are sequentially arranged along the first direction DR1. The first pixel includes a first sub-pixel 111, a second sub-pixel 112, and a third sub-pixel 113 that are located in the same row and sequentially arranged along the first direction DR1. The second pixel includes a fourth sub-pixel 114, a fifth sub-pixel 115, and a sixth sub-pixel 116 that are located in the same row and sequentially arranged along the first direction DR1.

The first scan line GL1 is electrically connected to a part of the sub-pixels in the first pixel unit 110. The second scan line GL2 is electrically connected to another part of the sub-pixels in the first pixel unit 110. The first pixel unit 110 is located between the first scan line GL1 and the second scan line GL2 in the second direction DR2.

The first sub-pixel 111 and the second sub-pixel 112 are located between the first data line and the second data line in the first direction DR1. The third sub-pixel 113 and the fourth sub-pixel 114 are located between the second data line and the third data line in the first direction DR1. The first data line is connected to the second sub-pixel 112 through a bottom connection, and the third data line is connected to the fifth sub-pixel 115 through a bottom connection.

It can be understood that, in the pixel structure and the display panel provided in this embodiment, the first data line and the third data line are respectively connected to the second sub-pixel 112 and the fifth sub-pixel 115 with higher brightness through a bottom connection. This can reduce the coupling capacitance suffered by the second sub-pixel 112 and the fifth sub-pixel 115. Further, the feeder (feed-through) voltages received by the second sub-pixel 112 and the fifth sub-pixel 115 are reduced, thereby reducing a visual phenomenon of shaking stripes.

In one embodiment, the first data line is connected to the first sub-pixel 111 through a top connection, the second data line is connected to the third sub-pixel 113 through a top connection, the second data line is connected to the fourth sub-pixel 114 through a bottom connection, and the third data line is connected to the sixth sub-pixel 116 through a top connection.

It should be noted that the connection manners of the first sub-pixel 111, the third sub-pixel 113, the fourth sub-pixel 114, and the sixth sub-pixel 116 to the corresponding data lines have been modified. This reduces the coupling capacitances of the first sub-pixel 111, the third sub-pixel 113, the fourth sub-pixel 114, and the sixth sub-pixel 116. Further, the feeder voltage Vft received by the first sub-pixel 111, the third sub-pixel 113, the fourth sub-pixel 114, and the sixth sub-pixel 116 is reduced.

The improvement of the feeder voltage corresponding to each sub-pixel is detailed in Table 1 below:

TABLE 1

| | First Sub-pixel | Second Sub-pixel | Third Sub-pixel | Fourth Sub-pixel | Fifth Sub-pixel | Sixth Sub-pixel |
|---|---|---|---|---|---|---|
| Vft before improvement | 0.901 V | 0.941 V | 0.885 V | 0.928 V | 0.929 V | 0.899 V |
| Vft after improvement | 0.850 V | 0.842 V | 0.849 V | 0.842 V | 0.845 V | 0.855 V |

It can be known from the above table that, with respect to the feeder voltage Vft before improvement of each sub-pixel, the feeder voltage Vft after improvement of each corresponding sub-pixel is correspondingly decreased. Correspondingly, this can improve the phenomenon of shaking stripes. In one cycle period, before the improvement, the feeder voltage Vft of the second sub-pixel 112 is at most 0.941 V, and after the improvement, the feeder voltage Vft of the fifth sub-pixel 115 is at most 0.845V. Both the second sub-pixel 112 and the fifth sub-pixel 115 may be, but not limited to, green sub-pixels. For example, other arrangements of sub-pixels may also be red sub-pixels or blue sub-pixels. Therefore, the feeder voltage Vft of the green sub-pixel decreases by about 0.096V. It can be inferred that the phenomenon of shaking stripes can be significantly improved.

In one embodiment, the first sub-pixel 111 and the fourth sub-pixel 114 are sub-pixels of the same color, the second sub-pixel 112 and the fifth sub-pixel 115 are sub-pixels of the same color, and the third sub-pixel 113 and the sixth sub-pixel 116 are sub-pixels of the same color pixel.

In one embodiment, the first sub-pixel 111 and the fourth sub-pixel 114 are both red sub-pixels, the second sub-pixel 112 and the fifth sub-pixel 115 are both green sub-pixels, and the third sub-pixel 113 and the sixth sub-pixel 116 are both blue sub-pixels.

In one embodiment, the first scan line GL1 is electrically connected to the first sub-pixel 111, the third sub-pixel 113, and the sixth sub-pixel 116. The second scan line GL2 is electrically connected to the second sub-pixel 112, the fourth sub-pixel 114, and the fifth sub-pixel 115.

In one embodiment, the second scan line GL2 is electrically connected to the first sub-pixel 111, the third sub-pixel 113, and the sixth sub-pixel 116. The first scan line GL1 is electrically connected to the second sub-pixel 112, the fourth sub-pixel 114, and the fifth sub-pixel 115.

In one of the embodiments, the pixel unit 100 further includes second pixel units 120. The second pixel unit 120 is adjacent to the first pixel unit 110 in the second direction DR2. Each sub-pixel in the second pixel unit 120 corresponds to each sub-pixel in the first pixel unit 110 in a column.

In one embodiment, the second pixel unit 120 includes a third pixel and a fourth pixel that are located in the same row and arranged in sequence along the first direction DR1. The third pixel includes a seventh sub-pixel 121, an eighth sub-pixel 122, and a ninth sub-pixel 123 that are located in the same row and arranged in sequence along the first direction DR1. The fourth pixel includes a tenth sub-pixel 124, an eleventh sub-pixel 125, and a twelfth sub-pixel 126 which are located in the same row and are sequentially arranged along the first direction DR1.

In one embodiment, the pixel structure further includes fourth scan lines GL4 sequentially arranged along the second direction DR2 and fourth data lines arranged sequentially along the first direction DR1. The second pixel unit 120 is located between the third scan line GL3 and the fourth scan line GL4 in the second direction DR2. The second scan line GL2 and the third scan line GL3 are located between the first pixel unit 110 and the second pixel unit 120 in the second direction DR2. The third scan line GL3 is electrically connected to a part of the sub-pixels in the second pixel unit 120. The fourth scan line GL4 is electrically connected to another part of the sub-pixels in the second pixel unit 120. The second data line is connected to the eighth sub-pixel through a bottom connection, and the fourth data line is connected to the eleventh sub-pixel 125 through a bottom connection.

It can be understood that the coupling capacitance received by the eighth sub-pixel 122 and the eleventh sub-pixel 125 can also be reduced, and the received feeder voltage can also be reduced, thereby further improving the phenomenon of shaking stripes.

In one embodiment, the second data line is connected to the seventh sub-pixel 121 through a top connection, and the third data line is connected to the ninth sub-pixel 123 through a top connection. The third data line is connected to the tenth sub-pixel 124 through a bottom connection, and the fourth data line is connected to the twelfth sub-pixel 126 through a top connection.

It can be understood that the coupling capacitances received by the seventh sub-pixel 121, the ninth sub-pixel 123, the tenth sub-pixel 124, and the twelfth sub-pixel 126 can also be reduced, and the received feeder voltage can also be reduced, which can further improve the phenomenon of shaking stripes.

In one embodiment, the first sub-pixel 111 and the seventh sub-pixel 121 are located in the same column and are both red sub-pixels. The polarities of the first sub-pixel 111 and the seventh sub-pixel 121 in the same frame are opposite. The second sub-pixel 112 and the eighth sub-pixel 122 are located in the same column and are both green sub-pixels. The polarities of the second sub-pixel 112 and the eighth sub-pixel 122 in the same frame are opposite. The third sub-pixel 113 and the ninth sub-pixel 123 are located in the same column and are both blue sub-pixels. The polarities of the third sub-pixel 113 and the ninth sub-pixel 123 in the same frame are opposite. The fourth sub-pixel 114 and the tenth sub-pixel 124 are located in the same column and are both red sub-pixels. The polarities of the fourth sub-pixel 114 and the tenth sub-pixel 124 in the same frame are opposite. The fifth sub-pixel 115 and the eleventh sub-pixel 125 are located in the same column and are both green sub-pixels. The polarities of the fifth sub-pixel 115 and the eleventh sub-pixel 125 in the same frame are opposite. The sixth sub-pixel 116 and the twelfth sub-pixel 126 are located in the same column and are both blue sub-pixels. The polarities of the sixth sub-pixel 116 and the twelfth sub-pixel 126 in the same frame are opposite.

In one of the embodiments, the first pixel units 110 and the second pixel units 120 are sequentially arranged in the second direction DR2.

It should be noted that, in the above embodiments, the first scan line may be the scan line GL1, the second scan line may be the scan line GL2, the third scan line may be the scan line GL3, the fourth scan line may be the scan line GL4, and the scan line GL5 may also be the first scan line and so on. The first data line may be the data line DLT, the second data line may be the data line DL2, the third data line may be the data line DL4, the fourth data line may be the data line DL4, the data line DL5 may also be the first data line, the data line DL6 may also be the second data line, and the data line DL7 may also be the third data line and so on.

The specific path of the top connection in the above embodiments may be that the connection line starts from a higher part of the corresponding data line and extends diagonally downward or extends to the upper region of the corresponding sub-pixel through a broken line. The specific path of the bottom connection can be that the connection line starts from the lower part of the corresponding data line, extends obliquely upward, or extends to the lower region of the corresponding sub-pixel through a broken line. The connection lines may be formed integrally with the corresponding data lines, but are not limited to.

In one of the embodiments, this embodiment provides a display panel. The display panel includes an array substrate, a color filter substrate opposite to the array substrate, and a liquid crystal layer encapsulated between the array substrate and the color filter substrate. The array substrate includes the pixel structure in at least one of the above embodiments. The pixel units 100 are periodically repeated along the first direction DR1 and/or the second direction DR2. The first direction DR1 is different from the second direction DR2.

It can be understood that, in the display panel provided by this embodiment, the first data line and the third data line are respectively connected to the second sub-pixel 112 and the fifth sub-pixel 115 with higher brightness through a bottom connection. This can reduce the coupling capacitance suffered by the second sub-pixel 112 and the fifth sub-pixel 115. Further, the feeder (feed-through) voltages received by the second sub-pixel 112 and the fifth sub-pixel 115 are reduced, thereby reducing the visual phenomenon of shaking stripes.

In addition, the pixel structure increases with the corresponding increase of scan lines and data lines and the number of pixel units 100 increases. For example, the pixel units 100 increased along the first direction DR1 in FIG. 4. Similarly, it can also add corresponding pixel units along the second direction DR2. Therefore, even if there is a difference in the size of the pixel structure, the phenomenon of shaking stripes can be significantly improved.

The above pixel structure may be, but not limited to, a fringe-field switching (FFS) type pixel structure or a vertical alignment (VA) type pixel structure. Other pixel structures that can be adapted to the concept of the present invention can also be used, which are not specifically limited herein.

Figure 5:
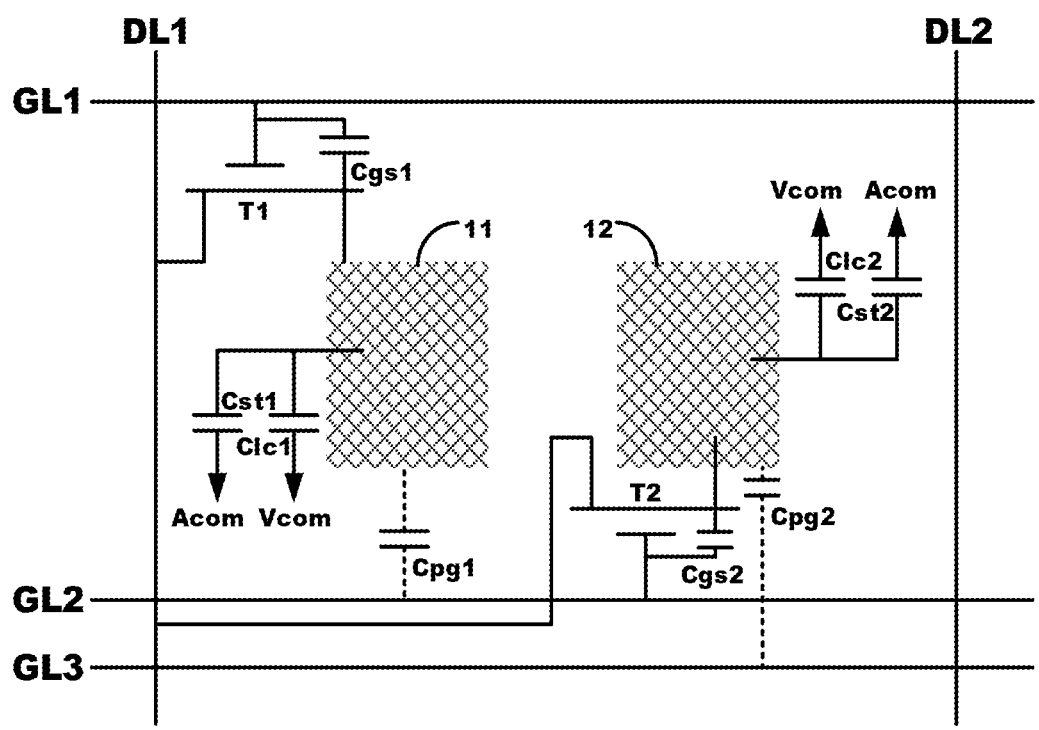
FIG. 5 is an equivalent circuit schematic diagram of some sub-pixels in FIG. 3 or FIG. 4.

As shown in FIG. 5, in the first sub-pixel 111, one of source/drain of a transistor T1 is electrically connected to the data line DL1. A gate of the transistor T1 is electrically connected to the scan line GL1. The other one of the source/drain of the transistor T1 is electrically connected to one end of a storage capacitor Cst1 and one end of a liquid crystal capacitor Clc1 through a pixel electrode 11. The other end of the storage capacitor Cst1 is configured to receive a common voltage signal Acom. The other end of the liquid crystal capacitor Clc1 is configured to receive a common voltage signal Vcom. When the scan signal in the scan line GL1 controls the transistor T1 to be turned on, a coupling capacitance Cpg1 is generated between the pixel electrode 11 and the scan line GL2.

In the second sub-pixel 112, one of source/drain of a transistor T2 is electrically connected to the data line DL1. A gate of the transistor T2 is electrically connected to the scan line GL2. The other one of the source/drain of the transistor T2 is electrically connected to one end of a storage capacitor Cst2 and one end of a liquid crystal capacitor Clc2 through a pixel electrode 12. The other end of the storage capacitor Cst2 is configured to receive a common voltage signal Acorn. The other end of the liquid crystal capacitor Clc2 is configured to receive a common voltage signal Vcom. When the scan signal in the scan line GL2 controls the transistor T2 to be turned on, a coupling capacitance Cpg2 is generated between the pixel electrode 12 and the scan line GL3.

It should be noted that, the technical means for connecting the corresponding scan lines and/or data lines of the same sub-pixel in the above embodiments can be improved individually or simultaneously. It can be understood that the corresponding improvement effect can be obtained whether it is improved individually or at the same time. Improvements can be made at the same time to achieve further improvements.

It can be understood that, for those of ordinary skill in the art, equivalent replacements or changes can be made according to the technical solutions of the present application and the inventive concept thereof, and all these changes or replacements should belong to the protection scope of the appended claims of the present application.

The invention claimed is:

1. A pixel structure, comprising:
a plurality of data lines arranged in sequence along a first direction;
a plurality of scan lines arranged in sequence along a second direction, wherein the first direction and the second direction are perpendicular to each other; and
a plurality of pixel rows arranged in sequence along the second direction, wherein one of the pixel rows is located between two adjacent ones of the scan lines, and there are two of the scan lines between two adjacent ones of the pixel rows;
wherein the one of the pixel rows comprises a plurality of first pixel units arranged in sequence along the first direction, one of the first pixel units comprises six sub-pixels located in a same row and arranged in sequence along the first direction, there are two of the sub-pixels of the one of the first pixel units between two adjacent ones of the data lines, and the two of the sub-pixels of the one of the first pixel units located between the two adjacent ones of the data lines are connected to a same one of the data lines; in a same one of the first pixel units, the sub-pixels with a highest brightness under a same gray scale are all connected to one of the scan lines at a next stage of the pixel rows where the same one of the first pixel units is located;
wherein one of the first pixel units comprises a first sub-pixel, a second sub-pixel, a third sub-pixel, a fourth sub-pixel, a fifth sub-pixel, and a sixth sub-pixel located in a same row and arranged in sequence along the first direction, the second sub-pixel and the fifth sub-pixel are the sub-pixels with the highest brightness under the same gray scale;
the scan lines comprise a first scan line, a second scan line, and a third scan line arranged in sequence along the second direction, the first scan line, the first pixel unit, the second scan line, the first scan line, the one of the first pixel units, the second scan line, and the third scan line are sequentially arranged along the second direction, the first scan line is connected to the first sub-pixel, the third sub-pixel, and the sixth sub-pixel, and the second scan line is connected to the second sub-pixel and the fifth sub-pixel;
wherein the second scan line is further connected with the fourth sub-pixel.

2. The pixel structure according to claim 1, wherein the first sub-pixel and the fourth sub-pixel are sub-pixels of a same color, the second sub-pixel and the fifth sub-pixel are sub-pixels of a same color, and the third sub-pixel and the sixth sub-pixel are sub-pixels of a same color.

3. The pixel structure according to claim 2, wherein the second sub-pixel and the fifth sub-pixel are both green sub-pixels.

4. The pixel structure according to claim 1, wherein another pixel row adjacent to the one of the pixel rows in the second direction further comprises a plurality of second pixel units, one of the second pixel units comprises six sub-pixels located in a same row and arranged in sequence along the first direction, there are two of the sub-pixels of the one of the second pixel units between two adjacent ones of the data lines, and the two of the sub-pixels of the one of the second pixel units located between the two adjacent ones of the data lines are connected to a same data line, in a same one of the second pixel units, the sub-pixels with a highest brightness under a same gray scale are all connected to the scan lines at a next stage of the pixel rows where the same one of the second pixel units is located.

5. The pixel structure according to claim 4, wherein one of the second pixel units comprises a seventh sub-pixel, an eighth sub-pixel, a ninth sub-pixel, a tenth sub-pixel, an eleventh sub-pixel, and a twelfth sub-pixel located in a same row and arranged in sequence along the first direction, the eighth sub-pixel and the eleventh sub-pixel are the sub-pixels with the highest brightness under the same gray scale;
the scan lines comprise a fourth scan line arranged along the second direction, the third scan line, the one of the second pixel unit, and the fourth scan line are sequentially arranged along the second direction, the third scan line is connected to the seventh sub-pixel, the ninth sub-pixel, and the twelfth sub-pixel, and the fourth scan line is connected to the eighth sub-pixel and the eleventh sub-pixel.

6. The pixel structure according to claim 5, wherein the fourth scan line is further connected to the tenth sub-pixel.

7. The pixel structure according to claim 6, wherein the first sub-pixel and the seventh sub-pixel are located in a same column and are both red sub-pixels, polarities of the first sub-pixel and the seventh sub-pixel in a same frame are opposite, the second sub-pixel and the eighth sub-pixel are located in a same column and are both green sub-pixels, and polarities of the second sub-pixel and the eighth sub-pixel in a same frame are opposite; the third sub-pixel and the ninth sub-pixel are located in a same column and are both blue sub-pixels, polarities of the third sub-pixel and the ninth sub-pixel in a same frame are opposite, the fourth sub-pixel and the tenth sub-pixel are located in a same column and are both red sub-pixels, and polarities of the fourth sub-pixel and the tenth sub-pixel in a same frame are opposite; the fifth sub-pixel and the eleventh sub-pixel are located in a same column and are both green sub-pixels, polarities of the fifth sub-pixel and the eleventh sub-pixel in a same frame are opposite, the sixth sub-pixel and the twelfth sub-pixel are located in a same column and are both blue sub-pixels, and polarities of the sixth sub-pixel and the twelfth sub-pixel in a same frame are opposite.

8. The pixel structure according to claim 4, wherein the first pixel units and the second pixel units are arranged alternately in sequence in the second direction.

9. A display panel, wherein the display panel comprises an array substrate, a color filter substrate disposed opposite to the array substrate, and a liquid crystal layer encapsulated between the array substrate and the color filter substrate, the array substrate comprises the pixel structure according to claim 1.

10. The display panel according to claim 9, wherein the first sub-pixel and the fourth sub-pixel are sub-pixels of a same color, the second sub-pixel and the fifth sub-pixel are sub-pixels of a same color, and the third sub-pixel and the sixth sub-pixel are sub-pixels of a same color.

11. The display panel according to claim 10, wherein the second sub-pixel and the fifth sub-pixel are both green sub-pixels.

12. The display panel according to claim 9, wherein another pixel row adjacent to the one of the pixel rows in the second direction further comprises a plurality of second pixel units, one of the second pixel units comprises six sub-pixels located in a same row and arranged in sequence along the first direction, there are two of the sub-pixels of the one of the second pixel units between two adjacent ones of the data lines, and the two of the sub-pixels of the one of the second pixel units located between the two adjacent ones of the data lines are connected to a same data line, in a same one of the second pixel units, the sub-pixels with a highest brightness under a same gray scale are all connected to the scan lines at a next stage of the pixel rows where the same one of the second pixel units is located.

13. The display panel according to claim 12, wherein one of the second pixel units comprises a seventh sub-pixel, an eighth sub-pixel, a ninth sub-pixel, a tenth sub-pixel, an eleventh sub-pixel, and a twelfth sub-pixel located in a same row and arranged in sequence along the first direction, the eighth sub-pixel and the eleventh sub-pixel are the sub-pixels with the highest brightness under the same gray scale;

the scan lines comprise a fourth scan line arranged along the second direction, the third scan line, the one of the second pixel unit, and the fourth scan line are sequentially arranged along the second direction, the third scan line is connected to the seventh sub-pixel, the ninth sub-pixel, and the twelfth sub-pixel, and the fourth scan line is connected to the eighth sub-pixel and the eleventh sub-pixel.

14. The display panel according to claim 13, wherein the fourth scan line is further connected to the tenth sub-pixel.

15. The display panel according to claim 14, wherein the first sub-pixel and the seventh sub-pixel are located in a same column and are both red sub-pixels, polarities of the first sub-pixel and the seventh sub-pixel in a same frame are opposite, the second sub-pixel and the eighth sub-pixel are located in a same column and are both green sub-pixels, and polarities of the second sub-pixel and the eighth sub-pixel in a same frame are opposite; the third sub-pixel and the ninth sub-pixel are located in a same column and are both blue sub-pixels, polarities of the third sub-pixel and the ninth sub-pixel in a same frame are opposite, the fourth sub-pixel and the tenth sub-pixel are located in a same column and are both red sub-pixels, and polarities of the fourth sub-pixel and the tenth sub-pixel in a same frame are opposite; the fifth sub-pixel and the eleventh sub-pixel are located in a same column and are both green sub-pixels, polarities of the fifth sub-pixel and the eleventh sub-pixel in a same frame are opposite, the sixth sub-pixel and the twelfth sub-pixel are located in a same column and are both blue sub-pixels, and polarities of the sixth sub-pixel and the twelfth sub-pixel in a same frame are opposite.

16. The display panel according to claim 12, wherein the first pixel units and the second pixel units are arranged alternately in sequence in the second direction.

* * * * *